United States Patent Office 2,863,910
Patented Dec. 9, 1958

2,863,910

BASIC ESTERS OF SUBSTITUTED β-BENZOYL-ACRYLIC ACIDS

Chester J. Cavallito, Decatur, Ill., and Frederick K. Kirchner, Albany, N. Y., assignors to Sterling Drug Inc., New York, N. Y., a corporation of Delaware No Drawing. Application March 23, 1956
Serial No. 573,321

8 Claims. (Cl. 260—477)

This invention relates to compositions of matter of the class of organic esters.

The invention here resides in the concept of a composition having a molecular configuration in which a tertiary amino group is attached through a lower alkylene diradical to the carboxyl group of a 4-substituted β-benzoylacrylic acid and to a process for physically embodying such concept. The quaternary ammonium salts of such composition are also included within the scope of our invention together with a process of making the same.

Among the radicals included within the scope of the term tertiary amino as herein employed are lower-dialkylamino radicals wherein the alkyl groups may be the same or different and each contain from one to about four carbon atoms. Such radicals include —N(CH$_3$)$_2$, —N(C$_2$H$_5$)$_2$, —N(C$_3$H$_7$)$_2$, —N[CH(CH$_3$)$_2$]$_2$, —N(C$_4$H$_9$)$_2$, —N[CH$_2$CH(CH$_3$)$_2$]$_2$ and the like. Also included are groups wherein the lower dialkylamino substituents together with the nitrogen atom are joined to form a saturated heterocyclic ring such as 1-piperidyl, 2-methyl-1-piperidyl, 3-ethyl-1-piperidyl, 4-methyl-1-piperidyl, 2,6-dimethyl-1-piperidyl, 1-pyrrolidyl, 2-methyl-1-pyrrolidyl, 3-ethyl-1-pyrrolidyl, 2,5-dimethyl-1-pyrrolidyl, 4-morpholinyl and the like.

The lower alkylene group has from two to about four carbon atoms with the free valencies on different carbon atoms and hence encompasses such groups as

—CH$_2$CH$_2$—, —CH$_2$CH$_2$CH$_2$—

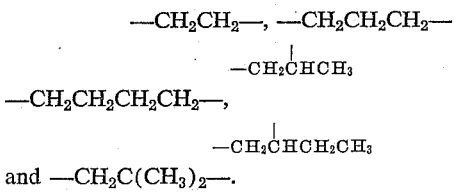

and —CH$_2$C(CH$_3$)$_2$—.

Tertiary amino lower alkyl radicals of the type useful in forming the compositions constituting the present invention are fully described in the art pertaining to such class of substances and any of such known radicals can be employed in making the compositions of the present invention. Preferred embodiments of the invention are formed from tertiary amino groups such as lower dialkylamino, 1-piperidyl, 1-pyrrolidyl and 4-morpholinyl radicals.

Among the 4-substituents of the β-benzoylacrylic acid which can be employed in forming the compositions of the present invention are lower alkoxy groups such as methoxy, ethoxy, propoxy, isopropoxy, butoxy, isobutoxy, and alkyl groups such as n-hexyl, n-heptyl, n-octyl, iso-octyl- di-tertiary butyl, (CH$_3$)$_3$C—C(CH$_3$)$_2$—, n-nonyl, n-decyl, n-undecyl and n-dodecyl, wherein the alkyl group has from six to about twelve carbon atoms.

The new alkamine esters are prepared by reacting the appropriate β-benzoylacrylic acid with an approximately equivalent amount of the appropriate tertiary-aminoalkyl halide, X—Y—N=B. The process of the invention proceeds to yield the new alkamine esters in the form of their hydrohalide salts according to the following equation

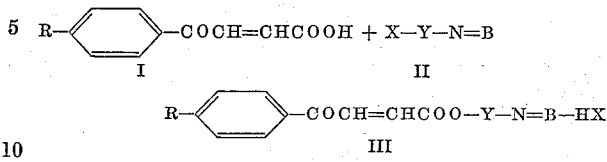

wherein N=B, Y and R have the meanings as described above for the tertiary amino, lower alkylene and the 4-substituent of the β-benzoylacrylic acid groups respectively, and X is a halogen atom preferably chlorine, bromine or iodine. The reaction can be carried out at temperatures between about 50° C. and 150° C. in a solvent such as a lower alkanol, which is inert under the conditions of the reaction. The alkamine ester is produced in the form of its hydrohalide salt. The corresponding free base can be obtained from the hydrohalide salt by treatment with an alkaline reagent such as an alkali metal hydroxide, carbonate or bicarbonate.

The alkamine esters of the invention are most conveniently used in the form of acid addition or quaternary ammonium salts. The acids which can be used to prepare acid addition salts are preferably those which produce when combined with the alkamine ester, salts whose anions are relatively innocuous to the animal organisms in therapeutic doses of the salts, so that the beneficial physiological properties inherent in the alkamine esters are not vitiated by side-effects ascribable to the anions. Appropriate acid-addition salts are those derived from mineral acids such as hydrochloric acid, hydrobromic acid, hydriodic acid and sulfuric acid; and organic acids such as acetic acid, citric acid and tartaric acid. The quarternary ammonium salts are obtained by the addition to the alkamine ester in free base form of alkyl or aralkyl esters of inorganic acids or organic sulfonic acids, including such compounds as methyl chloride, methyl bromide, methyl iodide, ethyl bromide, propyl chloride, benzyl chloride, benzyl bromide, methyl sulfate, methyl benzenesulfonate and methyl para-toluenesulfonate.

The process proceeds to yield the new quaternary ammonium salts according to the following equation

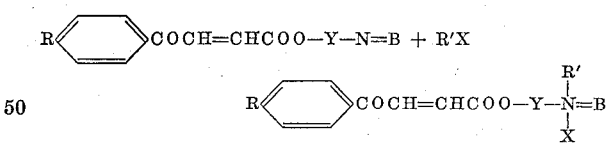

wherein R' is an alkyl or aralkyl group as described above and N=B, Y, R and X have the meanings hereinbefore described.

The following examples describe specific embodiments of the compositions of matter and explain the mode of operation thereof.

Example 1

A mixture of 10 g. of 4-octylbenzoylacrylic acid and 4.7 g. of diethylaminoethyl chloride in 100 ml. of isopropyl alcohol was refluxed for 3.5 hrs. When the mixture was cooled to room temperature, a solid precipitated. The solid product was removed by suction filtration, recrystallized from isopropyl alcohol and dried in a vacuum desiccator. The 2-diethylaminoethyl β-(4-octylbenzoyl) acrylate hydrochloride obtained weighed 1.5 g. and had the melting point 106.8–108.8° C. (corr.).

*Analysis.*—Calc'd for C$_{24}$H$_{38}$ClNO$_3$: C, 67.98; H, 9.03; Cl$_{ionic}$, 8.36. Found: C, 68.06; H, 9.08; Cl$_{ionic}$, 8.34.

2-diethylaminoethyl β-(4-octylbenzoyl) acrylate hydrochloride was found to possess antibacterial activity in vitro as follows:

| Organism | Log. Reciprocal Minimum Effective Concentration (mg./cc.) | |
|---|---|---|
| | Bacteriostatic | Bacteriocidal |
| Strep. pyogenes | 5.6 | 5.1 |
| E. typhi | <3.0 | <3.0 |
| Br. abortus | 4.0 | <3.0 |
| Cl. welchii | 6.3 | 6.3 |
| Myco. tuberc | 6.6 | 6.6 |

*Example 2*

2-diethylaminoethyl β-(4-hexylbenzoyl) acrylate hydrochloride was prepared from 10 g. of β-(4-n-hexylbenzoyl) acrylic acid and 5.2 g. of diethylaminoethyl chloride in 100 ml. of isopropyl alcohol according to the procedure described in Example 1. There was thus obtained 5.2 g. of 2-diethylaminoethyl β-(4-hexylbenzoyl) acrylate hydrochloride, melting point 110.8–112.4° C. (corr.).

*Analysis.*—Calc'd for $C_{22}H_{34}ClNO_3$: C, 66.73; H, 8.65; Cl, 8.95. Found C, 66.90; H, 8.45; Cl, 8.83.

2-diethylaminoethyl β-(4-hexylbenzoyl) acrylate hydrochloride was found to possess antibacterial activity in vitro as follows:

| Organism | Log. Reciprocal Minimum Effective Concentration (mg./cc.) | |
|---|---|---|
| | Bacteriostatic | Bacteriocidal |
| Strep. pyogenes | 5.3 | 3.6 |
| E. typhi | 3.6 | <3.0 |
| Br. abortus | 4.3 | 4.0 |
| Cl. welchii | 6.1 | 6.1 |
| Myco. tuberc | 5.1 | 5.1 |

*Example 3*

2-diethylaminoethyl β-(4-ethoxybenzoyl) acrylate hydrochloride was prepared from 6.6 g. of β-(4-ethoxybenzoyl) acrylic acid and 4.08 g. of diethylaminoethyl chloride in 75 ml. of isopropyl alcohol according to the procedure described in Example 1. After two recrystallizations from absolute ethyl alcohol there was obtained 2.35 g. of 2-diethylaminoethyl β-(4-ethoxybenzoyl) acrylate hydrochloride, melting point 131–132° (corr.).

*Analysis.*—Calc'd. for $C_{18}H_{26}ClNO_4$: C, 60.75; H, 7.37; $Cl_{ionic}$, 9.96. Found: C, 60.48; H, 7.37; $Cl_{ionic}$, 9.92.

2-diethylaminoethyl β-(4-ethoxybenzoyl) acrylate hydrochloride was found to possess antibacterial activity in vitro as follows:

| Organism | Log. Reciprocal Minimum Effective Concentration (mg./cc.) | |
|---|---|---|
| | Bacteriostatic | Bacteriocidal |
| Strep. pyogenes | 3.6 | 3.6 |
| E. typhi | 4.3 | 3.0 |
| Br. abortus | 4.6 | 4.6 |
| Cl. welchii | 4.3 | 4.3 |

*Example 4*

2-diethylaminoethyl β-(4-decylbenzoyl) acrylate hydrochloride was prepared from 10 g. of β-(4-n-decylbenzoyl) acrylic acid and 4.3 g. of diethylaminoethyl chloride in 100 ml. of isopropyl alcohol according to the procedure described in Example 1. The 2-diethylaminoethyl β-(4-decylbenzoyl) acrylate hydrochloride obtained after recrystallization from absolute ethyl alcohol weighed 2.3 g. and had the melting point 113.2–115.2° C. (corr.).

*Analysis.*—Calc'd for $C_{26}H_{42}ClNO_3$, C, 69.08; H, 9.37; Cl, 7.84. Found: C, 69.37; H, 9.40; Cl, 7.89.

2-diethylaminoethyl β-(4-decylbenzoyl) acrylate hydrochloride was found to possess antibacterial activity as follows:

| Organism | Log. Reciprocal Minimum Effective Concentration (mg./cc.) | |
|---|---|---|
| | Bacteriostatic | Bacteriocidal |
| Strep. pyogenes | 4.6 | 4.0 |
| E. typhi | <4.0 | <4.0 |
| Br. abortus | <4.0 | <4.0 |
| Cl. welchii | 6.1 | 6.1 |
| Myco. tuberc | 5.6 | 5.3 |

*Example 5*

2-diethylaminoethyl β-(4-n-dodecylbenzoyl) acrylate hydrochloride was prepared from 8 g. of β-(4-n-dodecylbenzoyl) acrylic acid and 3.14 g. of diethylaminoethyl chloride in 100 ml. of isopropyl alcohol according to the procedure described in Example 1. The 2.17 g. of 2-diethylaminoethyl β-(4-n-dodecylbenzoyl) acrylate hydrochloride thus obtained had the melting point 115.6–116.8° C. (corr.).

*Analysis.*—Calc'd for $C_{28}H_{46}ClNO_3$: C, 70.04; H, 9.66; N, 2.92. Found: C, 70.24; H, 9.72; N, 3.02.

2-diethylaminoethyl β-(4-n-dodecylbenzoyl) acrylate hydrochloride was found to possess antibacterial activity as follows:

| Organism | Log. Reciprocal Minimum Effective Concentration (mg./cc.) | |
|---|---|---|
| | Bacteriostatic | Bacteriocidal |
| Strep. pyogenes | 5.6 | 5.0 |
| E. typhi | <4.0 | <4.0 |
| Br. abortus | <4.0 | <4.0 |
| Cl. welchii | 6.0 | 5.12 |
| Myco. tuberc | 5.3 | 5.3 |

According to the manipulative procedures described in the above examples 3-(1-piperidyl) propyl β-(4-hexylbenzoyl) acrylate methiodide can be prepared from 3-(1-piperidyl) propyl β-(4-hexylbenzoyl) acrylate, prepared from β-(4-hexylbenzoyl) acrylic acid and 3-(1-piperidyl) propyl chloride, by quaternization with methyl iodide; 2-dimethylaminoethyl β-(4-hexylbenzoyl) acrylate methobromide can be prepared from 2-dimethylaminoethyl β-(4-hexylbenzoyl) acrylate and methyl bromide; the intermediate 2-dimethylaminoethyl β-(4-hexylbenzoyl) acrylate can be prepared from β-(4-hexylbenzoyl) acrylic acid and dimethylaminoethyl chloride; 3-diisopropylaminopropyl β-(4-butoxybenzoyl) acrylate ethochloride can be prepared by quaternization of 3-diisopropylaminopropyl β-(4-butoxybenzoyl) acrylate, which can be prepared from β-(4-butoxybenzoyl) acrylic acid and 3-diisopropylaminopropyl bromide, with ethyl chloride; 2-(1-pyrrolidyl) ethyl β-(4-hexylbenzoyl) acrylate methiodide can be prepared by quaternization of 2-(1-pyrrolidyl) ethyl β-(4-hexylbenzoyl) acrylate prepared from 2-(1-pyrrolidyl) ethyl β-(4-hexylbenzoyl) acrylic acid and 2-(1-pyrrolidyl) ethyl chloride, with methyl iodide; 2-diethylaminopropyl β-benzoylacrylate hydrochloride can be prepared from β-benzoylacrylic acid and 2-diethylaminopropyl chloride; 2-(4-methyl-1-piperidyl) ethyl β-(4-octylbenzoyl) acrylate hydrobromide can be prepared from β-(4-octylbenzoyl) acrylic acid and 2-(4-methyl-1-piperidyl) ethyl bromide; 3-(2-methyl-1-pyrrolidyl) propyl β-(4-heptylbenzoyl) acrylate hydrochloride can be prepared from β-(4-heptylbenzoyl) acrylic acid and 3-(2-methyl-1-pyrrolidyl) propyl chloride; and 2-(4-morpholinyl) ethyl β-(4-propoxybenzoyl) acrylate methiodide can be prepared by quaternization of 2-(4-morpholinyl) ethyl β-(4-propoxybenzoyl) acrylate hydrochloride, prepared from β-(4-propoxybenzoyl) acrylic acid and 2-(4-morpholinyl) ethyl chloride, by quaternization with methyl iodide.

The compounds of the invention possess bacteriostatic and bacteriocidal properties against such organisms as *Staphylococcus aureus, Eberthella typhi, Streptococcus pyogenes, Brucella abortus, Clostridium welchii, Mycobacterium tuberculosis* and the like.

To utilize the antibacterial activity, a salt of the compound is dissolved in water as, for example, a 1% solution, and applied to a surface to be disinfected by conventional means such as spraying, swabbing, immersing and the like.

We claim:

1. A compound selected from the group consisting of alkamine esters of β-benzoylacrylic acids having the formula

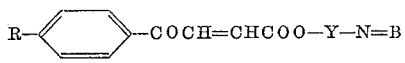

wherein N=B is a member of the group consisting of lower dialkylamino, 1-piperidyl, (lower alkylated)-1-piperidyl, 1-pyrrolidyl, (lower alkylated)-1-pyrrolidyl and 4-morpholinyl radicals; R is a member of the group consisting of lower alkoxy and alkyl groups wherein the alkyl group contains from 6 to 12 carbon atoms; Y is a lower alkylene group having from 2 to 4 carbon atoms; and the acid addition and quaternary ammonium salts thereof.

2. Di-lower alkylamino lower alkyl esters of 4-higher-alkyl substituted β-benzoylacrylic acids.

3. Di-lower alkylamino lower alkyl esters of 4-lower alkoxy substituted β-benzoylacrylic acids.

4. 2-diethylaminoethyl β-(4-n-hexylbenzoyl) acrylate hydrochloride.

5. 2-diethylaminoethyl β-(4-n-octylbenzoyl) acrylate hydrochloride.

6. 2-diethylaminoethyl β-(4-n-dodecylbenzoyl) acrylate hydrochloride.

7. The process for preparing an acid addition salt of an alkamine ester of a β-benzoylacrylic acid having the formula

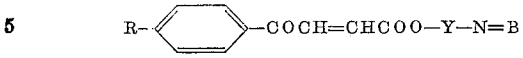

wherein N=B is a member of the group consisting of lower dialkylamino, 1-piperidyl, (lower alkylated)-1-piperidyl, 1-pyrrolidyl, (lower alkylated)-1-pyrrolidyl and 4-morpholinyl radicals; R is a member of the group consisting of lower alkoxy and alkyl groups wherein the alkyl group contains from 6 to 12 carbon atoms; and Y is a lower alkylene group having from 2 to 4 carbon atoms which comprises heating a β-benzoylacrylic acid with a tertiaryamino-alkyl halide. X—Y—N=B, wherein X is a member of the group consisting of chlorine, bromine and iodine.

8. The process for preparing a quaternary ammonium salt of an alkamine ester of a β-benzoylacrylic acid having the formula

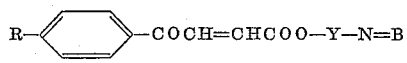

wherein N=B is a member of the group consisting of lower dialkylamino, 1-piperidyl, (lower alkylated)-1-piperidyl, 1-pyrrolidyl, (lower alkylated)-1-pyrrolidyl and 4-morpholinyl radicals; R is a member of the group consisting of lower alkoxy and alkyl groups wherein the alkyl group contains from 6 to 12 carbon atoms; and Y is a lower alkylene group having from 2 to 4 carbon atoms which comprises reacting an alkamine ester of a β-benzoylacrylic acid with an organic ester of an inorganic acid.

References Cited in the file of this patent

Cramer et al.: Journal of the American Pharmaceutical Association, Scientific Edition, vol. 37, pages 439–449, 1948.